(12) United States Patent
Keskin

(10) Patent No.: US 11,329,915 B2
(45) Date of Patent: May 10, 2022

(54) ROUTER AND METHOD FOR OPERATING A COMMUNICATION SYSTEM HAVING REDUNDANT ROUTERS

(71) Applicant: Siemens Aktiengesellschaft, Munich (DE)

(72) Inventor: Faruk Keskin, Ludwigshafen am Rhein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/419,428

(22) PCT Filed: Dec. 20, 2019

(86) PCT No.: PCT/EP2019/086522
§ 371 (c)(1),
(2) Date: Jun. 29, 2021

(87) PCT Pub. No.: WO2020/156746
PCT Pub. Date: Aug. 6, 2020

(65) Prior Publication Data
US 2022/0045946 A1 Feb. 10, 2022

(30) Foreign Application Priority Data
Jan. 31, 2019 (EP) ..................................... 19154677

(51) Int. Cl.
*H04L 12/713* (2013.01)
*H04L 12/851* (2013.01)
(Continued)

(52) U.S. Cl.
CPC ............ *H04L 45/586* (2013.01); *H04L 45/28* (2013.01); *H04L 45/74* (2013.01); *H04L 47/24* (2013.01)

(58) Field of Classification Search
CPC combination set(s) only.
See application file for complete search history.

(56) References Cited

U.S. PATENT DOCUMENTS 7,164,676 B1 1/2007 Chakraborty
9,191,271 B2 11/2015 Pitchai et al.
(Continued)

FOREIGN PATENT DOCUMENTS

| CN | 102711234 | 10/2012 |
|---|---|---|
| EP | 2127329 | 12/2009 |
| WO | 2017175033 | 10/2017 |

OTHER PUBLICATIONS

International Search Report dated Mar. 31, 2020 based on PCT/EP2019/086522 filed Dec. 20, 2019.
(Continued)

*Primary Examiner* — Xavier S Wong
(74) *Attorney, Agent, or Firm* — Cozen O'Connor

(57) ABSTRACT

Within a communication system having redundant routers, datagrams are forwarded from source communication devices to target communication devices via routers based on routing information stored in routing tables of the routers, wherein for each communication terminal, a virtual router is configured as a default gateway, to which virtual router a group of a plurality of routers is assigned, where routers from the same group assigned to a virtual router select from among themselves a router operated as the active default gateway, the routers not operated as the active default gateway are operated as reserve gateways, and where the active default gateway in question transmits, only upon a request for stored address assignments that is received from a reserve gateway, all stored address assignments to a requesting reserve gateway in bundled form.

13 Claims, 2 Drawing Sheets

(51) Int. Cl.
H04L 12/703 (2013.01)
H04L 12/741 (2013.01)
H04L 45/586 (2022.01)
H04L 47/24 (2022.01)
H04L 45/28 (2022.01)
H04L 45/74 (2022.01)

(56) References Cited

U.S. PATENT DOCUMENTS

2010/0091784 A1    4/2010   Brueckner
2014/0362866 A1*   12/2014   Sone ................... H04L 45/586
                                                      370/401
2015/0117179 A1*   4/2015   Sato ..................... H04L 45/00
                                                      370/219

OTHER PUBLICATIONS

International Preliminary Report on Patentability dated March dated Mar. 16, 2021 based on CT/EP2019/086522 filed Dec. 20, 2019.

* cited by examiner

ROUTER AND METHOD FOR OPERATING A COMMUNICATION SYSTEM HAVING REDUNDANT ROUTERS

CROSS-REFERENCE TO RELATED APPLICATIONS

This is a U.S. national stage of application No. PCT/EP2019/086522 filed 20 Dec. 2019. Priority is claimed on European Application No. 19154677.9 filed 31 Jan. 2019, the content of which is incorporated herein by reference in its entirety.

BACKGROUND OF THE INVENTION

1. Field of the Invention

The invention relates to industrial automation systems and, more particularly, to a router and method for operating a communication system having redundant routers.

2. Description of the Related Art

An industrial automation system usually comprises a multiplicity of automation devices that are networked to one another via an industrial communication network and is used within the context of production or process automation for the purpose of controlling or regulating installations, machines or devices. On account of time-critical constraints in industrial automation systems, realtime communication protocols, such as PROFINET, PROFIBUS, Real-Time Ethernet or Time-Sensitive Networking (TSN), are predominantly used for communication between automation devices.

Interruptions in communication connections between computer units in an industrial automation system or automation devices can result in undesirable or unnecessary repetition of a transmission of a service request. Furthermore, messages that are not transmitted or that are not transmitted completely can prevent an industrial automation system from changing to or remaining in a safe operating state, for example. This can finally result in failure of a entire production installation and costly production downtime. A particular set of problems regularly arises in industrial automation systems as a result of notification traffic containing comparatively many but relatively short messages, as a result of which the above problems are intensified.

In order to be able to compensate for failures of communication connections or devices, communication protocols, such as High-availability Seamless Redundancy or Parallel Redundancy Protocol, have been developed for high-availability industrial communication networks that can be operated in a redundant manner. High-availability Seamless Redundancy (HSR) and the Parallel Redundancy Protocol (PRP) are defined in the International Electrotechnical Commission (IEC) 62439-3 standard and make it possible to bumplessly transmit data packets in a redundant manner with extremely short recovery times. According to High-availability Seamless Redundancy and the Parallel Redundancy Protocol, each data frame (frame) is duplicated by a transmitting communication device and is sent to a receiver on two different paths. A communication device at the receiver end filters redundant data frames constituting duplicates from a received data stream.

The Media Redundancy Protocol (MRP) is defined in the IEC 62439-2 standard and makes it possible to compensate for individual connection failures in networks having a simple ring topology in the case of bumpy redundant transmission of data frames. According to the Media Redundancy Protocol, a redundancy manager is assigned to a switch having two ports inside the ring topology, which redundancy manager monitors the network for connection failures and possibly initiates a switching measure to close the ring. In the normal operating state, the redundancy manager uses test data frames to check whether an interruption has occurred within the ring topology.

If a switch or a connection within the ring topology fails, then test data frames transmitted from one port are no longer received at the respective other port. This can be used by the redundancy manager to detect a failure, and in the event of a failure the redundancy manager can forward data frames containing payload data from one port to the other port, and vice versa, unlike in the normal operating state.

The Common Address Redundancy Protocol (CARP) can be used to realize application servers, firewalls or routers as high-availability systems. For this purpose, at least two system components that are redundant with respect to one another are provided, which can undertake identical tasks and are assigned to the same subnetwork. The redundant system components each have a unique IP and MAC address and form a device pool. This device pool likewise has an allocated IP and MAC address that the other devices or systems use to communicate with the device pool. Here, one system component of the device pool undertakes a master role for performing the tasks of the device pool, while the other system components undertake a slave role. If the system component having the master role fails, a system component that previously had an assigned slave role undertakes the tasks thereof and is available via the IP or MAC address allocated to the device pool.

Whereas failure of a subsection within a route can be compensated for quite easily by dynamic routing or selection of an alternative section, failure of default gateways configured in terminals is more problematic. If the default gateway is not available as first router for the terminals, then routing is fundamentally not possible from an affected subnetwork. The Hot Standby Router Protocol (HSRP) is used to combine multiple routers to form a device group that realizes a logical router. The logical router is allocated an IP and MAC address via which a selected primary router of the device group is available. All other routers are secondary routers and are not available for the time being via the IP or MAC address allocated to the logical router. The primary router signals its operational readiness to the secondary routers via a multicast message, which is transmitted every 3 seconds as standard. If these multicast messages are not received over a relatively long period, e.g., 10 seconds, a previous secondary router is selected as the new primary router and ties the IP or MAC address allocated to the logical router to its network interface.

Problems as a result of failure of a default gateway or a first router for terminals can also be solved via the Virtual Router Redundancy Protocol (VRRP). In contrast to HSRP, VRRP provides no IPv6 support, but allows use of an IP address of a physically present router as IP address of a logical router realized by a device group. VRRPv3 (see Internet Engineering Task Force (IETF) RFC5798) supports both IPv4 and IPv6.

EP 2 127 329 A1 describes a method for filtering redundant data frames in a network node having at least two ports that each comprise a transmitting device and a receiving device. The data frames each have at least one MAC source address, a data frame ID and a CRC value. The transmitting devices each have a transmission list in which data frames to be transmitted are stored. The receiving devices each have a reception memory for storing received data frames. To filter redundant data frames in a network node of a communication network, it is proposed that, upon reception of a first data frame at one of the ports, the MAC source address indicated in the first data frame and the data frame ID of the first data frame are used to search the transmission list for a second data frame having an identical MAC source address and data frame ID. If such a second data frame is present, then the first data frame is rejected.

U.S. Pat. No. 9,191,271 B2 describes a method for an accelerated VRRP restoration process in which an Address Resolution Protocol (ARP) cache of a VRRP master router is synchronized with ARP caches of VRRP backup routers. A previous VRRP backup router therefore does not need to relearn allocations between MAC addresses and IP address as new VRRP master router following a switchover, but rather can use the allocations from the ARP cache of the previous VRRP master router. In the event of a new entry in its ARP cache, each VRRP router checks in each particular case whether it is configured as a VRRP master router. If this is the case, then the each VRRP router transmits the new entry to the VRRP backup routers. The ARP caches are therefore incrementally between the VRRP master router and the VRRP backup routers. This disadvantageously causes heavy message traffic with few payload data in each particular case. A further disadvantage is that only new ARP cache content is sent. If a VRRP backup router performs a restart or is started up at a later time, then this VRRP backup router does not know or no longer knows previously sent ARP cache content.

SUMMARY OF THE INVENTION

In view of the foregoing, it is an object of the present invention to provide an apparatus and efficient method for operating a communication system having redundant routers that allows a communication system to continue to operate as seamlessly as possible in the event of failure of a router operated as an active default gateway.

This and other objects and advantages are achieved in accordance with the invention by a router and a method for operating a communication system having redundant routers, where datagrams are forwarded within the communication system from source communication devices to destination communication devices by routers based on routing information stored in routing tables of the routers. A virtual router that has an assigned group of multiple routers and an allocated virtual data link layer address is configured as a default gateway for communication terminals in each particular case. A default gateway forwards all of the message traffic intended for a respective subnetwork to another subnetwork, for example. Routers from the same group assigned to a virtual router select from among one another one router that is operated as an active default gateway, where the routers that are not operated as an active default gateway are configured and operated as reserve gateways. In particular, the routers from the same group assigned to a virtual router can select from among one another the router operated as the active default gateway in accordance with the Common Address Redundancy Protocol, Virtual Router Redundancy Protocol or Hot Standby Router Protocol.

In accordance with the invention, the reserve gateways request, from the respective active default gateway, a transmission of stored address allocations between data link layer addresses and network layer addresses of detected communication devices. The address allocations between data link layer addresses and network layer addresses are preferably ascertained and used in accordance with the Address Resolution Protocol or Neighbour Discovery Protocol.

In accordance with the invention, the respective active default gateway transmits all of the stored address allocations in bundled form to a requesting reserve gateway in each particular case only upon a request for stored address allocations that is received from a reserve gateway. The reserve gateways each adopt address allocations transmitted by the respective active default gateway in their configuration directly and without results from an independent training procedure for address allocations. The reserve gateways select a new active default gateway from among one another in the event of failure of a previously active default gateway. The new active default gateway adopts the address allocations transmitted before the failure and the virtual data link layer address allocated to the virtual router as active default gateway for its operation. In accordance with the invention, a quality of a synchronization is testable by the reserve gateways at any time by virtue of the reserve gateways specifying a number of received address allocations in their respective request. Preferably, this occurs periodically, such as every 10 minutes. If the active default gateway discovers a discrepancy in a transmitted number, for example, then the active default gateway again transmits all of its address allocations.

Advantageously, switchover from a failed, previously active default gateway to a new active default gateway is effected directly based on the address allocations transmitted before the failure, without an additional training procedure for address allocations by the new active default gateway. This allows fast switchover without causing unnecessarily frequent message traffic for address synchronization between the active default gateway and the reserve gateways.

Preferably, the requests for stored address allocations are each transmitted by the reserve gateways to the active default gateway as unicast messages. An address of the active default gateway is known to the reserve gateways particularly on the basis of protocol properties. Correspondingly, the stored address allocations are advantageously transmitted by the respective active default gateway to the requesting reserve gateways as unicast messages in each particular case. In accordance with a further preferred embodiment of the present invention, the address allocations are provided as Type Length Value data objects in a payload data area of messages that are transmitted by the respective active default gateway to reserve gateways requesting address allocations. This simplifies verification of address allocations synchronized between the active default gateway and the reserve gateways.

In accordance with a further preferred embodiment of the present invention, the routers from the same group assigned to a virtual router interchange information about their respective operating state among one another and monitor the active default gateway for failure based on this information. Advantageously, upon a request received from a reserve gateway, the respective active default gateway transmits to the requesting reserve gateway, in addition to the stored address allocations, information about established static routes in each particular case. In particular, the new active default gateway can establish static routes in accordance with the information about static routes that was transmitted before the failure.

The reserve gateways preferably request the transmission of the address allocations from the active default gateway only after a predefined period from selection of the active default gateway has elapsed. In accordance with a further preferred embodiment of the present invention, the respective active default gateway periodically transmits updates for all of the stored address allocations in bundled form to the requesting reserve gateways. A request for transmission can fundamentally occur at any time, in particular after the reserve gateways have restarted. Furthermore, potential new active default gateways can delay pre-emption processes, as a result of which the latter occur only after transmission and establishment of transmitted address allocations has concluded. Correspondingly later, a role as active default gateway can be taken up. Additionally, a quality of a synchronization can be tested by the reserve gateways at any time by specifying a number of received address allocations in their respective request.

It is also an object of the invention to provide a router that implements the method in accordance with the above-disclosed embodiments and that has multiple connections for connection to one communication device in each particular case, a processor and a memory device for storing routing information in routing tables. The router is configured to forward datagrams from source communication devices to destination communication devices based on routing information and to select from a group of multiple routers that is assigned to a virtual router, together with these routers, a router that is operated as active default gateway, where the virtual router has an allocated virtual data link layer address and the routers that are not operated as active default gateway are configured and operated as reserve gateways.

In accordance with the invention, the router is further configured to request, as a reserve gateway, from the respective active default gateway, a transmission of stored address allocations between data link layer addresses and network layer addresses of detected communication devices and to transmit, as active default gateway, all of the stored address allocations in bundled form to a requesting reserve gateway in each particular case only upon a request for stored address allocations that is received from a reserve gateway. Furthermore, the router is configured to adopt, as reserve gateway, address allocations transmitted by the respective active default gateway in its configuration directly and without results from an independent training procedure for address allocations in each particular case and to select, together with other reserve gateways, a new active default gateway in the event of failure of a previously active default gateway. Additionally, the router is configured to adopt, as a new active default gateway, the address allocations transmitted before the failure and the virtual data link layer address allocated to the virtual router as active default gateway for its operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
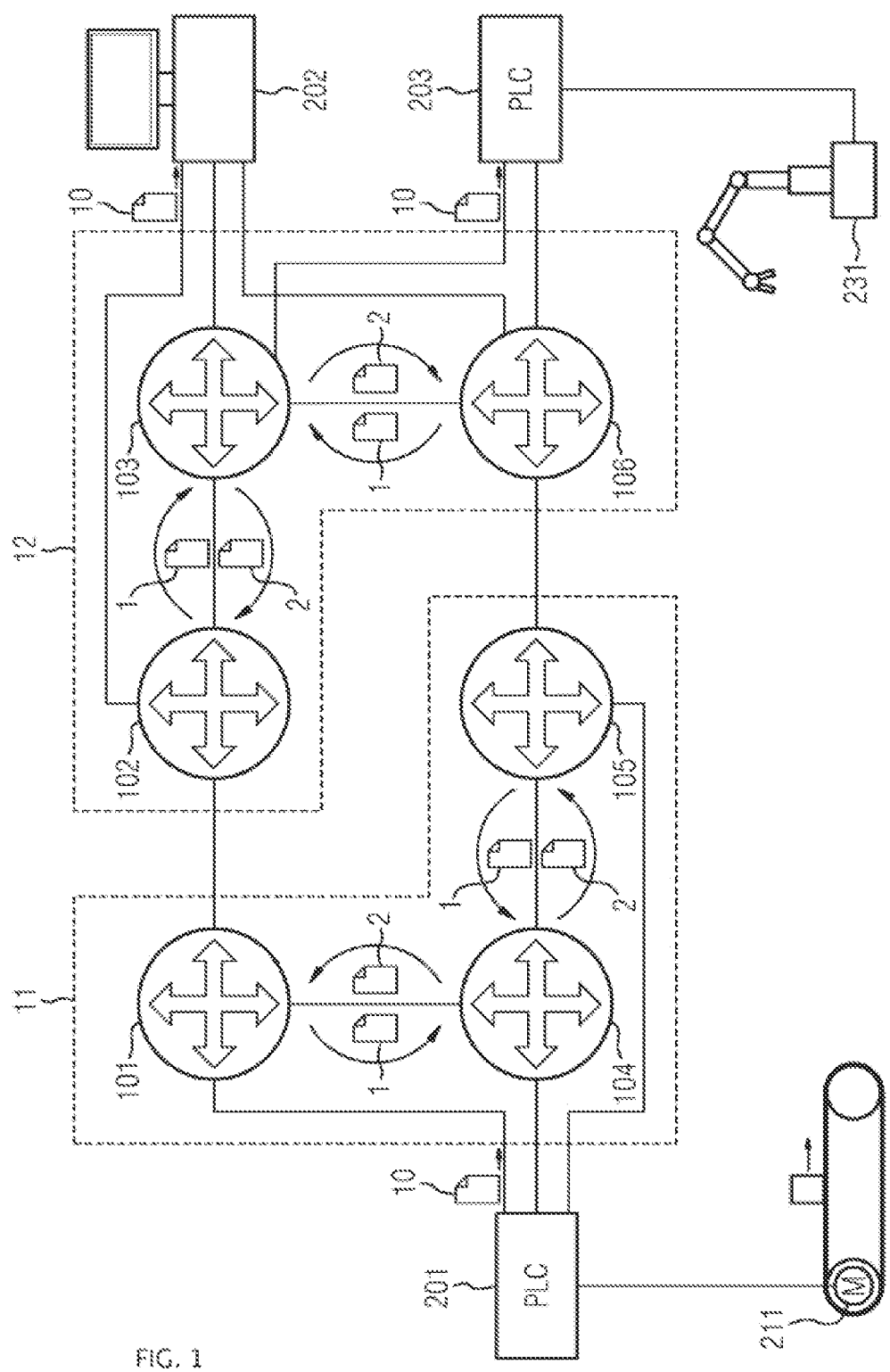
FIG. 1 shows a communication system comprising multiple communication devices for an industrial automation system in accordance with the invention.

The communication system for an industrial automation system depicted in FIG. 1 comprises multiple routers or gateways 101, 102, 103, 104, 105, 106 as communication devices that forward datagrams. Routers or gateways can comprise an integrated firewall and are particularly used for connecting programmable logic controllers 201, 203 or operating and observation stations 202, which are likewise communication devices or communication terminals.

Programmable logic controllers 201, 203 typically each comprise a communication module, a central processing unit and at least one input/output unit. Input/output units may fundamentally also be formed as local peripheral modules arranged remotely from a programmable logic controller. The communication module can be used to connect a programmable logic controller 201, 203 to a switch or router or additionally to a field bus. The input/output unit is used for interchanging control and measured variables between the programmable logic controller 201, 203 and a machine or apparatus 211, 231 controlled by the programmable logic controller 201, 203. In particular, the central processing unit is intended to ascertain suitable control variables from captured measured variables. The above components of the programmable logic controller 201, 203 are connected to one another via a backplane bus system, for example.

An operating and observation station 202 is used for visualising process data or measured and control variables processed or captured by programmable logic controllers, input/output units or sensors. In particular, an operating and observation station 202 is used to display values from a control loop and to alter control parameters. Operating and observation stations 202 comprise at least one graphical user interface, an input device, a processor unit and a communication module.

The routers 101, 102, 103, 104, 105, 106 forward datagrams 10 from source communication devices to destination communication devices based on routing information stored in routing tables of the routers. Depending on the transmitted information, the programmable logic controllers 201, 203 or the operating and observation station 202 can be firstly source communication devices and secondly destination communication devices and can therefore combine both roles. In the present exemplary embodiment, the programmable logic controllers 201, 203 and the operating and observation station 202 are communication terminals for which a virtual router that has an assigned group 11, 12 of multiple routers 101, 104-105, 102-103, 106 and an allocated virtual data link layer address is configured as a default gateway in each particular case.

Routers 101, 104-105, 102-103, 106 from the same group 11, 12 assigned to a virtual router select among one another one router that is operated as active default gateway. The routers that are not operated as active default gateway are configured and operated as reserve gateways in this case. By way of example, the routers 101, 104-105, 102-103, 106 from the same group 11, 12 assigned to a virtual router select from among one another the router operated as the active default gateway in accordance with the Common Address Redundancy Protocol (CARP), Virtual Router Redundancy Protocol (VRRP) or Hot Standby Router Protocol (HSRP). Furthermore, the routers 101, 104-105, 102-103, 106 from the same group 11, 12 assigned to a virtual router interchange information about their respective operating state among one another and monitor the active default gateway for failure based on this information. In the present exemplary embodiment, a scenario in which the routers 104 and 103 are operated as default gateways is assumed.

The reserve gateways 101, 105, 102, 106 request, from the respective active default gateway 104, 103 a transmission of stored address allocations between media access control (MAC) addresses and IP addresses of detected communication devices and transmit appropriate requests 1 for this purpose. The address allocations between MAC addresses and IP addresses are ascertained and used in accordance with the Address Resolution Protocol (ARP) or Neighbor Discovery Protocol (NDP), for example. Preferably, the reserve gateways 101, 105, 102, 106 request the transmission of the address allocations, in particular as defined by an Initial Network Convergence, from the active default gateway 104, 103 only after a predefined period from selection of the active default gateway has elapsed. The statements below can fundamentally be applied both to IPv6 addresses and IPv6-based protocols and for IPv4 addresses and IPv4-based protocols.

The respective active default gateway 104, 103 transmits all of the stored address allocations 2 in bundled form to a requesting reserve gateway in each particular case only upon a request 1 for stored address allocations that is received from a reserve gateway 101, 105, 102, 106. The reserve gateways 101, 105, 102, 106 adopt address allocations transmitted by the respective active default gateway 104, 103 in their configuration directly and without results from an independent training procedure for address allocations in each particular case. Preferably, upon a request 1 received from a reserve gateway 101, 105, 102, 106 the respective active default gateway 104, 103 transmits to the requesting reserve gateway, in addition to the stored address allocations 2, information about established static routes in each particular case. Furthermore, the respective active default gateway 104, 103 periodically transmits updates for all of the stored address allocations 2 in bundled form to the requesting reserve gateways after a request for the first time.

In a particularly preferred embodiment, the requests 1 for stored address allocations are transmitted by the reserve gateways 101, 105, 102, 106 to the active default gateway 104, 103 as unicast messages in each particular case. Accordingly, the stored address allocations 2 are also transmitted by the respective active default gateway 104, 103 to the requesting reserve gateways as unicast messages in each particular case. Moreover, the address allocations are provided as Type Length Value data objects in a payload data area of messages 2 that are transmitted by the respective active default gateway 104, 103 to reserve gateways requesting address allocations.

In the event of failure of a previously active default gateway 104, 103, the reserve gateways 101, 105, 102, 106 select a new active default gateway among one another. By way of example, the router 101 or 106 can be selected as new active default gateway. The new active default gateway 104, 106 adopts the address allocations 2 transmitted before the failure and the virtual data link layer address allocated to the virtual router as active default gateway for its operation and establishes, if required, static routes in accordance with the information about static routes that was transmitted before the failure. In particular, in the present exemplary embodiment, switchover from a failed, previously active default gateway 104, 103 to a new active default gateway 101, 106 is effected without an additional training procedure for address allocations by the new active default gateway, but rather directly based on the address allocations transmitted before the failure.

Figure 2:
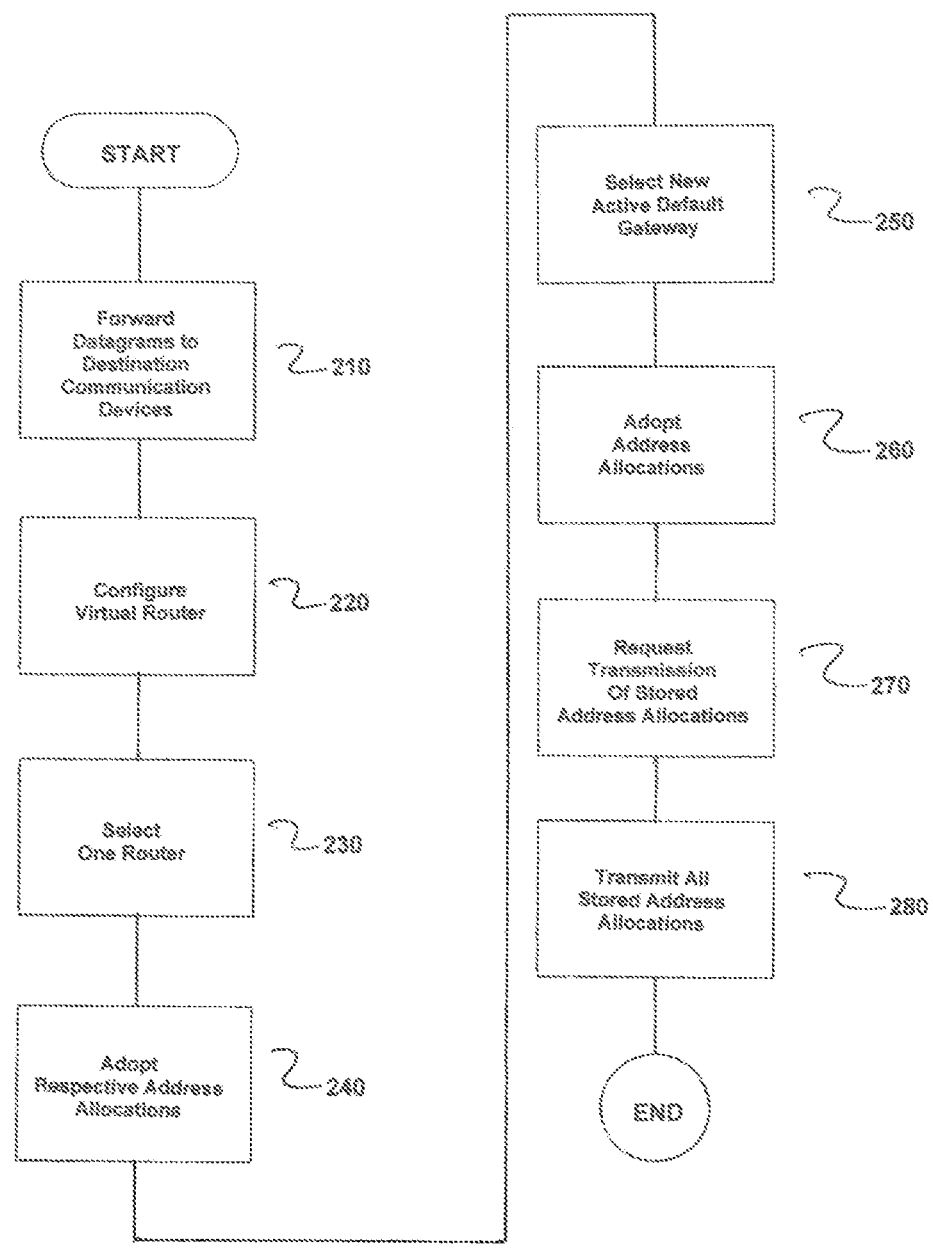
FIG. 2 is a flowchart of the method in accordance with the invention.

FIG. 2 is a flowchart of the method for operating a communication system having redundant routers. The method comprises forwarding, by routers 101, 102, 103, 104, 105, 106, datagrams 10 within the communication system from source communication devices to destination communication devices based on routing information stored in routing tables of the routers 101, 102, 103, 104, 105, 106, as indicated in step 210. Next, a virtual router having an assigned group 11, 12 of a plurality of routers and an allocated virtual data link layer address as a respective default gateway for communication terminals 201, 202, 203 is configured, as indicated in step 220.

Next, routers from the same group assigned to a virtual router among one another select one router 104, 103 that is operated as an active default gateway, as indicated in step 230. Here, the routers that are not operated as active default gateway are configured and operated as reserve gateways.

Next, the reserve gateways adopt respective address allocations transmitted by a respective active default gateway in their configuration directly and without results from an independent training procedure for address allocations, as indicated in step 240.

Next, the reserve gateways select a new active default gateway among one another in the event of failure of a previously active default gateway, as indicated in step 250.

Next, the new active default gateway adopts the address allocations transmitted before the failure and allocating the virtual data link layer address to the virtual router as the active default gateway for its operation, as indicated in step 260.

Next, the reserve gateways request transmission of stored address allocations between data link layer addresses and network layer addresses of detected communication devices from the respective active default gateway, as indicated in step 270.

Next, the respective active default gateway 104, 103 transmits all stored address allocations 2 in bundled form to a requesting reserve gateway in each case only upon a request 1 for stored address allocations which is received from a reserve gateway, as indicated in step 280. In accordance with the invention, the quality of a synchronization is testable by the reserve gateways at any time by virtue of the reserve gateways specifying a number of received address allocations in their respective request.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a communication system having redundant routers, the method comprising:
   forwarding, by routers, datagrams within the communication system from source communication devices to destination communication devices based on routing information stored in routing tables of the routers;
   configuring a virtual router having an assigned group of a plurality of routers and an allocated virtual data link layer address as a respective default gateway for communication terminals;
   selecting, by routers from the same group assigned to a virtual router among one another, one router which is operated as an active default gateway, the routers which are not operated as active default gateway being configured and operated as reserve gateways;
   adopting, by the reserve gateways, respective address allocations transmitted by a respective active default gateway in their configuration directly and without results from an independent training procedure for address allocations;
   selecting, by the reserve gateways, a new active default gateway among one another in an event of failure of a previously active default gateway;
   adopting, by the new active default gateway, the address allocations transmitted before the failure and allocating the virtual data link layer address to the virtual router as the active default gateway for its operation;
   requesting, by the reserve gateways, a transmission of stored address allocations between data link layer addresses and network layer addresses of detected communication devices from the respective active default gateway; and
   transmitting, by the respective active default gateway, all stored address allocations in bundled form to a requesting reserve gateway in each case only upon a request for stored address allocations which is received from a reserve gateway;
   wherein a quality of a synchronization is testable by the reserve gateways at any time by virtue of the reserve gateways specifying a number of received address allocations in their respective request.

2. The method as claimed in claim 1, wherein switchover from a failed, previously active default gateway to a new active default gateway is effected directly based on the address allocations transmitted before the failure, without an additional training procedure for address allocations by the new active default gateway.

3. The method as claimed in claim 1, wherein the routers from the same group assigned to a virtual router interchange information about their respective operating state among one another and monitor the active default gateway for failure based on this information.

4. The method as claimed in claim 2, wherein the routers from the same group assigned to a virtual router interchange information about their respective operating state among one another and monitor the active default gateway for failure based on this information.

5. The method as claimed in claim 1, wherein upon a request received from a reserve gateway the respective active default gateway transmits to the requesting reserve gateway, in addition to the stored address allocations, information about established static routes in each case.

6. The method as claimed in claim 5, wherein the new active default gateway establishes static routes in accordance with the information about static routes transmitted before the failure.

7. The method as claimed in claim 1, wherein the reserve gateways request the transmission of the address allocations from the active default gateway only after a predefined period from selection of the active default gateway has elapsed.

8. The method as claimed in claim 1, wherein the address allocations between data link layer addresses and network layer addresses are ascertained and utilized in accordance with an Address Resolution Protocol or Neighbour Discovery Protocol.

9. The method as claimed in claim 1, wherein the respective active default gateway periodically transmits updates for all the stored address allocations in bundled form to the requesting reserve gateways.

10. The method as claimed in claim 1, wherein the requests for stored address allocations are each transmitted by the reserve gateways to the active default gateway as unicast messages; and wherein the stored address allocations are each transmitted by the respective active default gateway to the requesting reserve gateways as unicast messages.

11. The method as claimed in claim 1, wherein the address allocations are provided as Type Length Value data objects in a payload data area of messages transmitted by the respective active default gateway to reserve gateways requesting address allocations.

12. The method as claimed in claim 1, wherein the routers from the same group assigned to a virtual router select from among one another the router operated as active default gateway in accordance with a Common Address Redundancy Protocol, Virtual Router Redundancy Protocol or Hot Standby Router Protocol.

13. A router comprising:
   a plurality of connections for connection to one communication device in each particular case;
   a processor; and
   a memory device for storing routing information in routing tables;
   wherein the processor, when executing, causes the router to:
      forward datagrams from source communication devices to destination communication devices based on routing information;
      select from a group of a plurality of routers which is assigned to a virtual router, together with these routers, a router operated as an active default gateway, the virtual router having an allocated virtual data link layer address and the routers which are not operated as active default gateway being configured and operated as reserve gateways;
      adopt, as a reserve gateway, each address allocations transmitted by the respective active default gateway in its configuration directly and without results from an independent training procedure for address allocations;
      select, together with other reserve gateways, a new active default gateway in the event of failure of a previously active default gateway; and
      adopt, as new active default gateway, the address allocations transmitted before the failure and the virtual data link layer address allocated to the virtual router as active default gateway for its operation; and
   wherein the processor, when executing, further causes the router to:

request, as the reserve gateway, from the respective active default gateway, a transmission of stored address allocations between data link layer addresses and network layer addresses of detected communication devices;

transmit, as the active default gateway, all stored address allocations in bundled form to a requesting reserve gateway in each case only upon a request for stored address allocations which is received from a reserve gateway; and test, as reserve gateways, a quality of a synchronization by virtue of the router specifying a number of received address allocations in its respective request.

\* \* \* \* \*